United States Patent [19]

Raatz

[11] 4,361,084
[45] Nov. 30, 1982

[54] INDUSTRIAL PEELER FOR ONIONS OR THE LIKE BULBOUS AND TUBEROUS VEGETATION

[76] Inventor: Gábor J. Raátz, Generaal Foulkesweg 89, 6700 AH Wageningen, Netherlands

[21] Appl. No.: 228,827

[22] Filed: Jan. 27, 1981

[51] Int. Cl.³ ............... A23N 15/04; A23N 15/08
[52] U.S. Cl. .................. 99/516; 99/584; 99/636; 99/643
[58] Field of Search ............... 99/516, 534, 536, 540, 99/584, 589, 635, 636, 643, 552, 553, 549, 564, 625, 628; 198/410–412, 415, 631

[56] References Cited

U.S. PATENT DOCUMENTS 3,696,848 10/1972 Mellon et al. ............ 99/516
3,745,913 7/1973 Hobbs .................... 99/625
3,915,083 10/1975 Spruijt ................... 99/636

FOREIGN PATENT DOCUMENTS 7901641 1/1979 Netherlands ............ 99/584
7906250 8/1979 Netherlands ............ 99/584

Primary Examiner—Philip R. Coe
Assistant Examiner—Timothy F. Simone
Attorney, Agent, or Firm—Beveridge, DeGrandi & Kline

[57] ABSTRACT

Vegetables such as onions are rotated about their axes which are vertically oriented. As the vegetables move from an orienting unit to a cutting/notching mechanism, their rectilinear movement is ensured by engaging their opposite sides by opposed members which are linked so as to move equal lateral distances when they are deflected by the vegetables.

9 Claims, 4 Drawing Figures

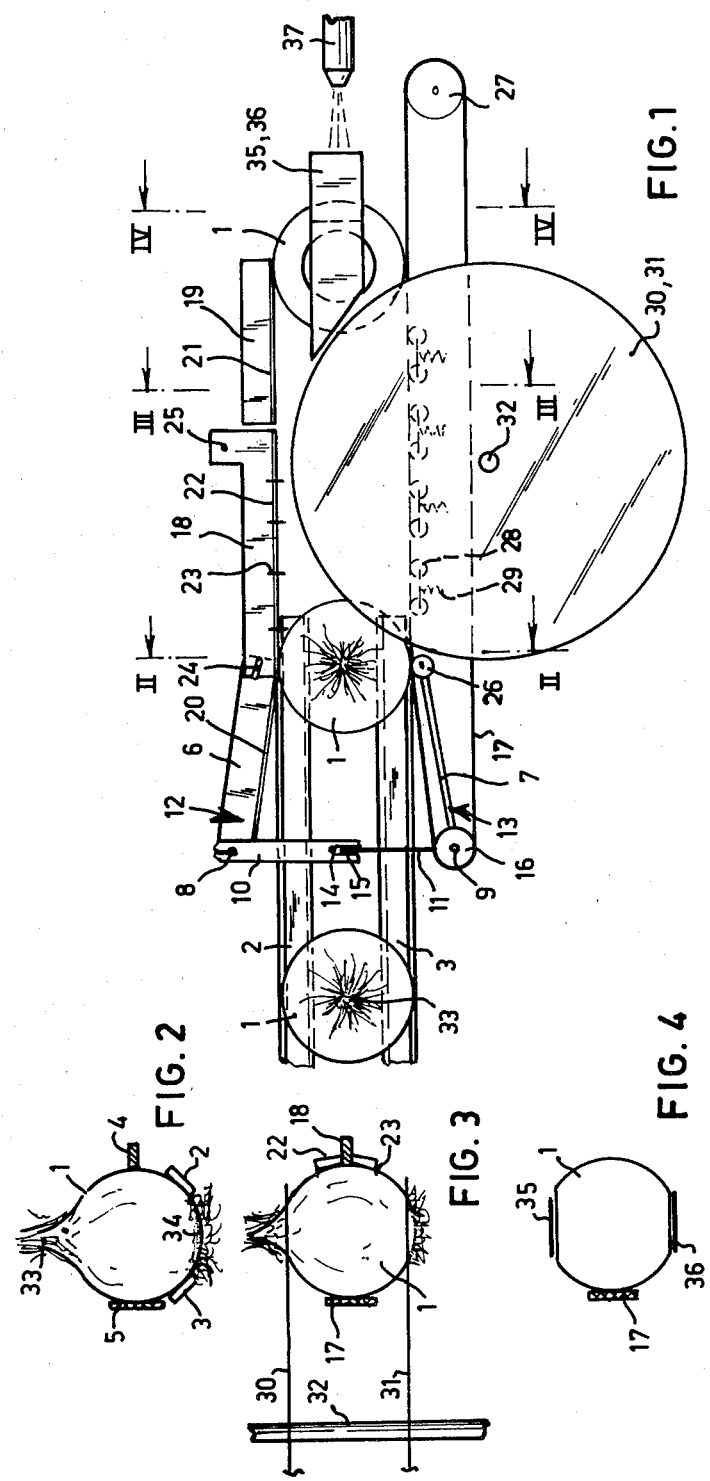

INDUSTRIAL PEELER FOR ONIONS OR THE LIKE BULBOUS AND TUBEROUS VEGETATION

BACKGROUND

The present invention relates to an industrial peeler for onions or the like bulbous and tuberous vegetations.

In a machine disclosed in Dutch patent application No. 79 01641, there is at least one orienting unit in which the onions are caused to spin about a substantially vertical axis of rotation, extending along the tail and root, with the aid of at least one endless flexible means. A cutting mechanism cuts off the tails and root remainders; and, a notch mechanism, combined with the cutting mechanism, makes at least one indentation in the outer scales or skin of the onions. The combined mechanism also has at least one flexible endless means for rotating the onions, and a blow mechanism to remove the skin. The upper sections of the endless resilient means of the orienting unit extend obliquely downwardly at the location where the onions are transferred to the resilient endless means of the cutting and notching mechanism.

In the machine described above, the transfer of onions from the orienting unit to the combined cutting and notch mechanism does not take place in the correct way. This problem can be caused, in part, by the fact that the path in which the onions move forward is not rectilinear, as it is impossible to have both flexible means of the combined mechanism yield equal distances when an onion is supplied. If the two guides are set apart to form a larger mutual distance, onions may accumulate in the transfer area so that the correct operation of the machine is disturbed.

SUMMARY OF THE INVENTION

The invention tends to improve the above mentioned operation. According to the invention this is achieved in that, at the location where the onions are transferred from the orienting unit to the cutting and notching unit, the sides of the onions are engaged by two opposed members positioned by linkage means which cause them to move equal lateral distances when they are deflected by an arriving vegetable thereby preventing lateral shifting of the vegetable. Preferably one of the opposed members is a flexible belt, and the linkage means is a pair of levers one of which carries a guide roll for the belt. Facing ends of the levers cooperate by means of a pin and slot connection, whereas the other ends of said levers adapt the distance between the opposed members with respect to the size of the onion to be processed.

It also appeared that the respective machine can be formed in a considerably simpler way when one of the two opposed members of both the orienting unit and the combined cutting and notch mechanism is immovable in a forward direction. Efficient embodiments of such a machine have as a common characterizing feature that, opposite to the flexibe member of the cutting and notching unit, a notch blade bar is provided which is adapted to pivot about a fixedly arranged support shaft. The free end of the notch blade bar is connected to one of the levers by a pin and slot connection. The cutting mechanism preferably includes two rotating knives with a rotation centerline at the side of the flexible member, and horizontal guides are located forwardly of the rotating knives. If the direction of rotation of the rotating knives is opposite to the spinning direction of the onions which is given thereto by the resilient means, the respective onions are entrailed as it were. Furthermore it is desirable that the flexible means of the cutting and notch unit have a speed which is over 15 to 20% higher than that of the flexible means of the orienting unit.

In order to guarantee that the guidance is as correct as possible it is further more efficient to provide the notch blade bar with a knife extending longitudinally of the mechanism and with notch blades placed in perpendicular planes on the notch blade bar at regular distances with a substantially hollow cutting side. The invention will be further elucidated hereinafter on the basis of the drawing in which by way of example, an embodiment is shown of a machine according to the invention.

DESCRIPTION OF THE DRAWINGS

FIG. 1 is a schematic plan view of a preferred mechanism for orienting, cutting and notching onions and similar bulbous and tuberous plants, and FIGS. 2-4 are simplified cross-sections as seen along the lines II—II, III—III and IV—IV respectively of FIG. 1.

DESCRIPTION OF A PREFERRED EMBODIMENT

In the mechanism as illustrated in FIG. 1, the onions 1 move from the left to the right through the mechanism as shown in the drawing. Initially, at the left in FIG. 1 and in the simplified cross-section of FIG. 2, the onions are caused to spin about a vertical axis of rotation by a stationary belt 2 and a moving endless belt 3. Onion-supporting guides 4 and 5 are illustrated in FIG. 2.

The infeed section of the cutting and notching mechanism is funnel-shaped and can adapt itself to the diameters of the onions in a sufficiently wide range so that the spinning axis remains rectilinear. For that purpose this infeed section is equipped with a guide of the pantograph type in which two arms 6 and 7 of the same size always rotate about the same angle about the shafts 8 and 9. These arms are fixedly connected to the bars 10 and 11, so that levers 12 and 13 are created, wherein the bar of the one lever has a slot 14 and the bar 11 of the other lever has a pin 15. Furthermore, a guide roll 16 of an endless conveyor belt 17 rotates about the shaft 9. The same could in principle be associated with the shaft 8 opposite thereto. However, in this embodiment, the mechanism has only one endless conveyor belt 17 which cooperates with the opposed arm 6 of lever 12. The arm 6 is rectilinearly immovable and it has a cutting edge 20 which enables it to serve as a first blade bar. There are also a notch blade bar 18, and a subsequent fixed blade bar 19.

The blade bar 6 and the subsequent fixed blade bar 19 are provided with horizontal continuously extending cutting edges 20 and 21. The notch blade bar 18 is provided with a horizontal continuously extending blade 22, and also with notch blades 23, placed preferably perpendicular to this blade 22 at mutually regular distances. According to FIG. 3, the blades 23 have a configuration which is adapted somewhat to the bulb-configuration of the onions.

The notch blade bar 18 is pivotally supported by shaft 25, and it is pivotally connected to the arm 6 by means of a shaft 24. A guide roll 26 is located substantially symmetrical opposite the shaft 24, and is supported on arm 7 of lever 13, said guide roll 26 forming a part of the guide assembly for the conveyor belt 17. This guide assembly also includes at least one driven guide roll 27, and tensioning elements with rolls 28 and springs 29 which equally bias the conveyor belt 17 toward the bars 18 and 19.

The above described mechanism appears to assure that the tail 33 and root 34 (FIG. 2) can be realizably removed from the onions by means of the knives 30 and 31, which are rotatingly driven by a shaft 32 (FIG. 3), so that the onions will be given the appearance shown in FIG. 4. This may also be partially attributable to the fact that the onions and the rotating knives 30 and 31 rotate in opposite directions, i.e. the onions rotate counter-clockwise and the rotating knives rotate clockwise, vide FIG. 1. So as it were the onions are conveyed by the rotating knives. Furthermore, a difference in speed between approximately 15 and 20% between the moving belt 3 of the orienting unit and the conveyor belt 17 appears to be efficient. As an example, the belt 3 is given a speed of approximately 70 m/sec. and the belt 17 has a speed of approximately 90 m/sec.

Guides 35 and 36 are connected to the apparatus forwardly of the rotating knives 30 and 31. These guides are located above and below the cut surfaces of the onions, and they keep the onions in the correct position during the operation of the blow nozzle 37. The blow nozzle 37 produces a jet of air as soon as a rotating onion, which has had its skin sufficiently loosened by the notch blades, arrives between the guides 35 and 36. Then the onion is completely peeled and, upon passing the rear end of the fixed blade bar 19, it falls down in a tray placed in the machine frame. The cut-off tails and roots and the blown-off scales also arrive in the tray, but the separation of these components does not form a large problem and is not part of the invention.

A complete, industrial peeler is preferably embodied with two processing tracks, placed on a chassis in a mirror-image arrangement, and then it has a capacity of approximately 1 ton per hour.

Also other embodiments, not shown in the drawing, are covered by the scope of the claims.

What is claimed is:

1. An industrial peeler for vegetables such as onions which have skins, roots, tails and central axes which extend through the roots and tails, comprising,
   an orienting unit provided with means for guiding vegetables for movement along a path at an orientation where their central axes are vertically disposed, said orienting unit including a first endless flexible means for rotating the vegetables about their vertical central axes and for moving the vegetables in a forward direction,
   a cutting and notching unit having an infeed end disposed to receive vegetables from the orienting unit, said cutting and notching unit including cutting means for cutting off the roots and tails of the vegetables, notching means for forming notches in the skins of the vegetables, and blowing means for blowing the skins from the vegetables after the notches have been formed, first and second opposed members which engage the opposite sides of a vegetable in the cutting and notching unit, said second opposed member being a second endless flexible means which is supported on guide rolls and is operable for rotating the vegetables about their vertical central axes and for moving the vegetables in a forward direction through the cutting and notching unit, both of said opposed members being laterally deflectable by the arrival of a vegetable at the infeed end of the cutting and notching unit, linkage means associated with said opposed members for causing said opposed members to move equal lateral distances at said infeed end when they are deflected by a vegetable, said linkage means being operable to prevent the central axes of the vegetables from shifting laterally as they enter the infeed end of the cutting and notching unit.

2. The apparatus of claim 1 wherein the linkage means includes a pair of levers, each of which has one leg associated with a respective one of the opposed members, each of said levers having a second leg connected by a pin and slot connection to the second leg of the other said lever.

3. The apparatus of claim 1 wherein said cutting means includes two rotating knives, said apparatus including horizontal guides disposed above and below the vegetable forwardly of said knives.

4. The apparatus of claim 3 wherein the rotating knives are driven in a direction which is opposite to the rotational direction of the vegetables.

5. The apparatus of any one of claims 1-3 wherein the speed of the second endless flexible means of the cutting and notching unit is at least fifteen percent higher than the speed of the first endless flexible means of the orienting unit.

6. An apparatus according to any one of claims 1-3 wherein the notching means is a notched blade bar on the first opposed member, said notched blade bar having a longitudinally extending knife and provided with projecting notch blades at intervals therealong.

7. The apparatus of claim 6 wherein the notching means also includes a fixed blade bar.

8. An apparatus according to any one of claims 1-3 including spring loaded rolls for biasing the second endless flexible means of the cutting and notching unit toward the vegetables therein.

9. The apparatus of claim 1 wherein the linkage means includes a pair of levers, each of which has one leg associated with a respective one of the opposed members, each of said levers having a second leg connected by a pin and slot connection to the second leg of the other said lever, said first opposed member being supported for pivotal movement about an axis (25) which is in a same longitudinal plane as the pivot axis (8) of one of said levers.

* * * * *